(12) United States Patent
Griffith

(10) Patent No.: US 7,784,882 B2
(45) Date of Patent: Aug. 31, 2010

(54) POWER INTERRUPT MANAGEMENT FOR AN AIRCRAFT ELECTRIC BRAKE SYSTEM

(75) Inventor: T. Todd Griffith, Seattle, WA (US)

(73) Assignee: The Boeing Company, Chicago, IL (US)

( * ) Notice: Subject to any disclaimer, the term of this patent is extended or adjusted under 35 U.S.C. 154(b) by 965 days.

(21) Appl. No.: 11/535,449

(22) Filed: Sep. 26, 2006

(65) Prior Publication Data

US 2008/0073970 A1 Mar. 27, 2008

(51) Int. Cl.
*B60T 8/86* (2006.01)
(52) U.S. Cl. .................. 303/126; 303/9.63; 303/122.04; 303/122.08
(58) Field of Classification Search .............. 303/9, 303/9.63, 20, 122.04, 122.05, 122.08, 126; 244/110 A, 110 H, 111; 701/29, 31, 33, 36, 701/70, 76
See application file for complete search history.

(56) References Cited

U.S. PATENT DOCUMENTS

| | | | | |
|---|---|---|---|---|
| 5,176,429 | A | * | 1/1993 | Junichi et al. .......... 303/122.05 |
| 5,411,324 | A | * | 5/1995 | Zydek et al. .......... 303/122.05 |
| 5,752,748 | A | * | 5/1998 | Schramm et al. .............. 303/20 |
| 6,095,293 | A | | 8/2000 | Brundrett et al. |
| 6,702,069 | B2 | | 3/2004 | Ralea et al. |
| 2005/0067888 | A1 | * | 3/2005 | Nilsson ....................... 303/20 |

FOREIGN PATENT DOCUMENTS

WO PCT/US2007/018829 8/2007

* cited by examiner

*Primary Examiner*—Xuan Lan Nguyen
(74) *Attorney, Agent, or Firm*—Tung & Associates

(57) ABSTRACT

An electric brake system for an aircraft as described herein electrically actuates brake mechanisms in a seamless manner when a power interrupt condition is experienced. While operating in an autobraking mode and in response to a power interrupt condition, the electric brake system preserves the last brake actuation command generated by the autobrake function. After normal operating power is reestablished, the last brake actuation command is retrieved and processed by the electric brake system. While operating in a pedal braking mode and in response to a power interrupt condition, the electric brake system discards the last brake actuation command generated from brake pedal interaction. After normal operating power is reestablished, the brake pedal data is refreshed to generate a new brake actuation command. These procedures reduce lurching and unexpected brake actuation levels following a power interrupt in the electric brake system.

14 Claims, 3 Drawing Sheets

POWER INTERRUPT MANAGEMENT FOR AN AIRCRAFT ELECTRIC BRAKE SYSTEM

TECHNICAL FIELD

Embodiments of the present invention relate generally to an electric brake system for an aircraft. More particularly, embodiments of the present invention relate to a brake control scheme that gracefully handles power interrupts in the electric brake system.

BACKGROUND

Under normal operating conditions, an electric brake system for an aircraft relies upon a continuous power supply (or supplies) that provide operating power for the processing components, electric brake actuators, and other elements of the electric brake system. The power supply (which may include an active power source that is driven by the aircraft engine or engines and/or a backup power supply such as a battery) need not be devoted to the electric brake system and, therefore, the supply voltages for the electric brake system may fluctuate within system tolerances in response to the current power demands of the aircraft. Under certain operating conditions the electric brake system may experience a very brief power interrupt during which a supply voltage to the electric brake system drops below a specified voltage.

Even though aircraft typically recover from power interrupts in a very short time period, the resumption of nominal operating power for the electric brake system may result in discontinuous control of the electric brake actuators. Such discontinuities may cause the aircraft to lurch or apply the brakes in an unusual manner that is noticeable to the passengers and crew. For example, a power interrupt experienced during autobraking may trick the electric brake system, cause the control architecture to interpret the power interrupt as a lack of deceleration, and cause the control architecture to attempt an increase in the clamping force of the electric brake actuators in a compensating manner. Upon resumption of nominal operating power, however, the current state of the electric brake actuators may result in an "overbraking" condition that results in more deceleration than expected by the passengers and crew. On the other hand, a power interrupt experienced during pedal braking may cause the electric brake system to save the pre-interrupt values of the electric brake actuator control signals. Upon resumption of nominal operating power, however, the saved pre-interrupt values may not accurately reflect the current brake pedal deflection entered by the pilot. The effect on the aircraft will vary depending upon the difference (in both sign and magnitude) between the saved pre-interrupt values of the electric brake actuator control signals and the current post-interrupt values.

BRIEF SUMMARY

The techniques and technologies described herein control the operation of an electric brake system of an aircraft to reduce the noticeable side effects that may otherwise result from power interrupts experienced by the electric brake system. In connection with an autobraking operation, one embodiment saves the pre-interrupt values of the electric brake actuator control signals and processes the saved values upon resumption of nominal operating power. In connection with a pedal braking operation, one embodiment discards the pre-interrupt values of the electric brake actuator control signals and refreshes the values upon resumption of nominal operating power. These techniques enable the electric brake system to provide seamless application of the aircraft brakes in response to a power interrupt condition.

The above and other techniques and technologies may be carried out in one embodiment by a method of operating an electric brake system for an aircraft. The method involves monitoring a power status signal of the electric brake system, detecting onset of a power interrupt condition based upon the power status signal, and controlling the electric brake system to provide seamless application of brakes upon termination of the power interrupt condition.

The above and other techniques and technologies may be carried out in one embodiment by a method of operating an electric brake system for an aircraft. The method involves: operating the electric brake system in an autobrake mode; in response to onset of a power interrupt condition in the electric brake system, storing a last autobrake command as a saved autobrake command, wherein autobrake commands control electric actuation of a brake mechanism in the electric brake system; and, upon termination of the power interrupt condition, processing the saved autobrake command.

The above and other techniques and technologies may be carried out in one embodiment by an electric brake system for an aircraft. The electric brake system includes a brake mechanism, an electric brake actuator coupled to the brake mechanism, and a brake control architecture coupled to the electric brake actuator. The brake control architecture includes processing logic that is configured to control actuation of the electric brake actuator, monitor a power status signal of the electric brake system, detect onset of a power interrupt condition based upon the power status signal, and control the electric brake actuator to provide seamless actuation of the brake mechanism upon termination of the power interrupt condition.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with a variety of different aircraft brake systems and aircraft configurations, and that the system described herein is merely one example embodiment of the invention.

For the sake of brevity, conventional techniques and components related to signal processing, aircraft brake systems, brake system controls, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in FIG. 1 and FIG. 2 depict example arrangement of elements, additional intervening elements, devices, features, or components may be present in an embodiment of the invention.

Figure 1:
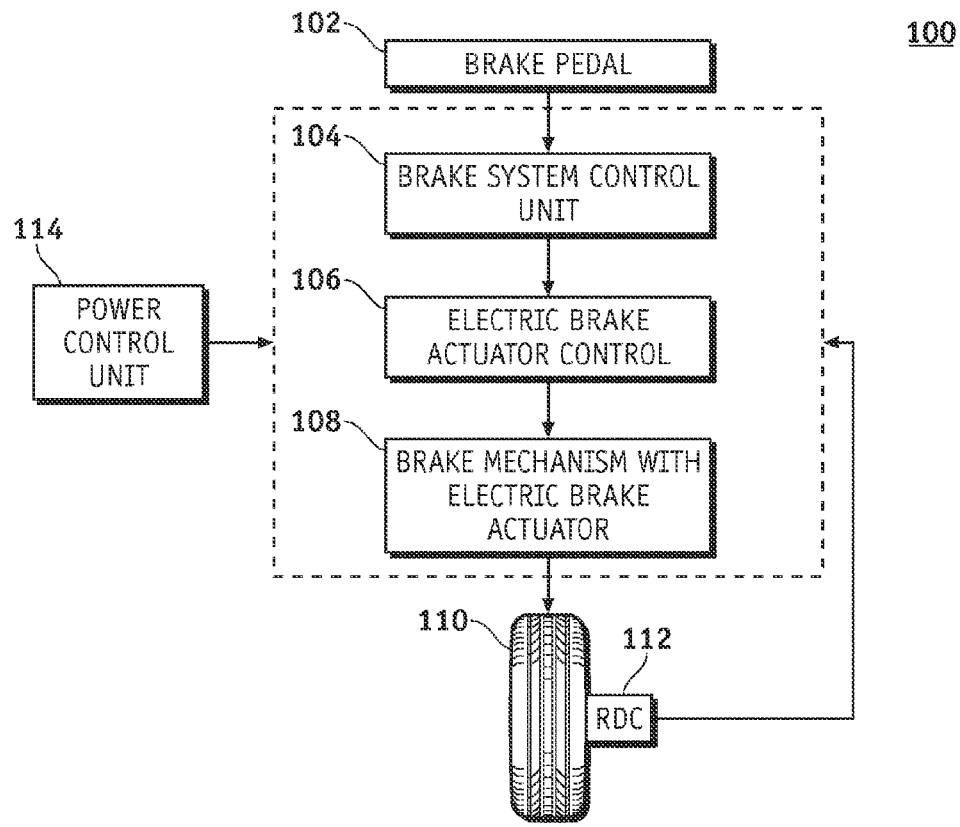
FIG. 1 is a simplified schematic representation of a portion of an electric brake system suitable for use in an aircraft.
Figure 2:
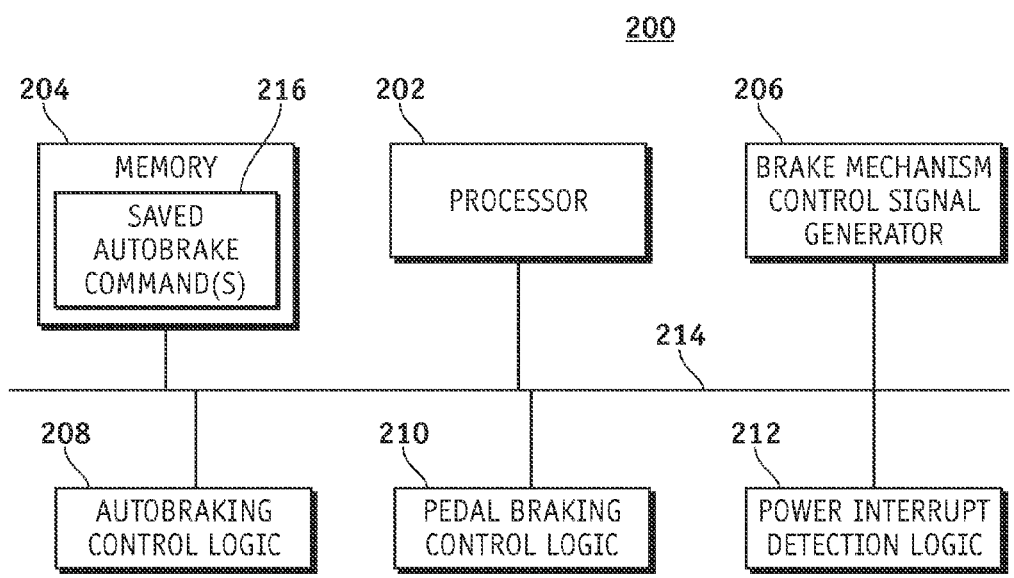
FIG. 2 is a schematic representation of a brake control architecture suitable for use in an electric brake system for an aircraft.

FIG. 1 is a schematic representation of a portion of an electric brake system 100 suitable for use in an aircraft (not shown). Electric brake system 100 includes a brake pedal 102, a brake system control unit (BSCU) 104 coupled to brake pedal 102, an electric brake actuator control (EBAC) 106 coupled to BSCU 104, and a brake mechanism 108 coupled to EBAC 106. Brake mechanism 108 corresponds to at least one wheel 110 of the aircraft. Electric brake system 100 may also include an axle-mounted remote data concentrator (RDC) 112 coupled to wheel 110. Briefly, BSCU 104 reacts to manipulation of brake pedal 102 and generates control signals that are received by EBAC 106. In turn, EBAC 106 generates brake mechanism control signals that are received by brake mechanism 108. In turn, brake mechanism 108 actuates to slow the rotation of wheel 110. These features and components are described in more detail below.

Electric brake system 100 can be applied to any number of electric braking configurations for an aircraft, and electric brake system 100 is depicted in a simplified manner for ease of description. An embodiment of electric brake system 100 may include a left subsystem architecture and a right subsystem architecture, where the terms "left" and "right" refer to the port and starboard of the aircraft, respectively. In practice, the two subsystem architectures may be independently controlled in the manner described below. In this regard, an embodiment of electric brake system 100 as deployed may include a left brake pedal, a right brake pedal, a left BSCU, a right BSCU, any number of left EBACs coupled to and controlled by the left BSCU, any number of right EBACs coupled to and controlled by the right BSCU, a brake mechanism for each wheel (or for each group of wheels), and an RDC for each wheel (or for each group of wheels). In operation, the electric brake system can independently generate and apply brake actuator control signals for each wheel of the aircraft or concurrently for any group of wheels.

Brake pedal 102 is configured to provide pilot input to electric brake system 100 during pedal braking operations. The pilot physically manipulates brake pedal 102, resulting in deflection or movement (i.e., some form of physical input) of brake pedal 102. This physical deflection is measured from its natural position by a hardware servo or an equivalent component, converted into a BSCU pilot command control signal by a transducer or an equivalent component, and sent to BSCU 104. The BSCU pilot command control signal may convey brake pedal sensor data that may include or indicate the deflection position for brake pedal 102, the deflection rate for brake pedal 102, a desired braking condition for brake mechanism 108, or the like.

An embodiment of electric brake system 100 may use any number of BSCUs 104. For ease of description, this example includes only one BSCU 104. BSCU 104 is an electronic control unit that has embedded software that digitally computes EBAC control signals that represent braking commands. The electrical/software implementation allows further optimization and customization of braking performance and feel if needed for the given aircraft deployment.

BSCU 104 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration. In one embodiment, BSCU 104 is implemented with a computer processor (such as a PowerPC) that hosts software and provides external interfaces for the software.

BSCU 104 monitors various aircraft inputs to provide control functions such as, without limitation: pedal braking; parking braking; autobraking; and gear retract braking. In addition, BSCU 104 blends antiskid commands (which could be generated internally or externally from BSCU 104) to provide enhanced control of braking. BSCU 104 obtains pilot command control signals from brake pedal 102, along with wheel data (e.g., wheel speed, rotational direction, tire pressure, etc.) from RDC 112. BSCU 104 processes its input signals and generates one or more EBAC control signals that are received by EBAC 106. In practice, BSCU 104 transmits the EBAC control signals to EBAC 106 via a digital data bus. In a generalized architecture (not shown), each BSCU can generate independent output signals for use with any number of EBACs under its control.

BSCU 104 may be coupled to one or more associated EBACs 106. EBAC 106 may be implemented, performed, or realized in the manner described above for BSCU 104. In one embodiment, EBAC 106 is realized with a computer processor (such as a PowerPC) that hosts software, provides external interfaces for the software, and includes suitable processing logic that is configured to carry out the various EBAC operations described herein. EBAC 106 obtains EBAC control signals from BSCU 104, processes the EBAC control signals, and generates the brake mechanism control signals (brake actuator signals) for brake mechanism 108.

Notably, the functionality of BSCU 104 and EBAC 106 may be combined into a single processor-based feature or component. In this regard, BSCU 104, EBAC 106, or the combination thereof can be considered to be a brake control architecture for electric brake system 100. Such a brake control architecture includes suitably configured processing logic, functionality, and features that support the brake control operations described herein.

Wheel 110 may include an associated brake mechanism 108, which includes or is coupled to at least one electric brake actuator configured to impart clamping force to a brake rotor of brake mechanism 108. EBAC 106 controls brake mechanism 108 to apply, release, modulate, and otherwise control the actuation of the respective electric brake actuators. In this regard, EBAC 106 generates the brake mechanism control signals in response to the respective EBAC control signals generated by BSCU 104. The brake mechanism control signals are suitably formatted and arranged for compatibility with the particular brake mechanism 108 utilized by the aircraft. In practice, the brake mechanism control signals may be regulated to carry out anti-skid and other braking maneuvers. Those skilled in the art are familiar with aircraft brake mechanisms and the general manner in which they are controlled, and such known aspects will not be described in detail here.

Electric brake system 100 may include or communicate with one or more sensors for wheel 110. These sensors are suitably configured to measure wheel data (wheel speed, direction of wheel rotation, tire pressure, wheel/brake temperature, etc.) for wheel 110, where the wheel data can be utilized by electrical braking system 100. RDC 112 is generally configured to receive, measure, detect, or otherwise obtain data for processing and/or transmission to another component of electric brake system 100. Here, RDC 112 is coupled to (or is otherwise associated with) wheel 110, and RDC 112 is configured to collect and transmit its wheel data to BSCU 104. The digital data communication bus or buses on the aircraft may be configured to communicate the wheel data from RDC 112 to BSCU 104 using any suitable data communication protocol and any suitable data transmission scheme. In an alternate embodiment, RDC 112 may be configured to communicate the wheel data to EBAC 106. In yet another embodiment, RDC 112 may be configured to communicate the wheel data (or portions thereof) to both BSCU 104 and EBAC 106.

Electric brake system 100 may include or cooperate with a suitably configured power control unit or subsystem 114. Power control unit 114 may be coupled to BSCU 104, EBAC 106, brake mechanism 108, and/or to other components of electric brake system 100. Power control unit 114 may be configured to regulate, remove, or otherwise control power to one or more components of electric brake system 100 as needed to achieve a desired operating power mode. Power control unit 114 may also be configured to monitor the aircraft power systems and power buses that feed electric brake system 100. For example, power control unit 114 may be coupled to an active power supply and/or to a backup power supply (e.g., a battery) for the aircraft. The active power supply may include a generator coupled to an engine and a suitably configured AC-to-DC converter, such as a transformer rectifier unit (TRU). In this embodiment, the active power supply provides power generated from the aircraft engine(s), while the backup power supply provides power to the aircraft when the engine(s) are not running. Power control unit 114 may be suitably configured to provide operating power to electric brake system 100 from the active power supply and/or the backup power supply as needed to support the functionality of electric brake system 100.

FIG. 2 is a schematic representation of a brake control architecture 200 suitable for use in an electric brake system for an aircraft. Electric brake system 100 may employ an embodiment of brake control architecture 200. For example, brake control architecture 200 may be implemented or realized in BSCU 104 and/or EBAC 106. Brake control architecture 200 may include, without limitation: a processor 202 having suitably configured processing logic; an appropriate amount of memory 204; a brake mechanism control signal generator 206; autobraking control logic 208; pedal braking control logic 210; and power interrupt detection logic 212. These elements may be coupled together using a data communication bus 214 or any suitably configured interconnection architecture or arrangement. In this embodiment, brake control architecture 200 is configured to control the electric brake system in a manner that seamlessly handles power interrupt conditions, as described in more detail below.

Processor 202 may be implemented, performed, or realized in the manner described above for BSCU 104. The processing logic corresponding to processor 202 is designed to carry out various operations and functions associated with the electric brake control schemes described herein. Furthermore, a method or algorithm (or portions thereof) described in connection with the embodiments disclosed herein may be embodied directly in hardware, in firmware, in a software module executed by processor 202, or in any practical combination thereof. A software module may reside in memory 204, which may be realized as one or more physical components having RAM memory, flash memory, ROM memory, EPROM memory, EEPROM memory, registers, a hard disk, a removable disk, a CD-ROM, or any other form of storage medium known in the art. In this regard, memory 204 can be coupled to processor 202 such that processor 202 can read information from, and write information to, memory 204. In the alternative, memory 204 may be integral to processor 202. As an example, processor 202 and memory 204 may reside in an ASIC.

Although depicted separately from processor 202 in FIG. 2, brake mechanism control signal generator 206, autobraking control logic 208, pedal braking control logic 210, and/or power interrupt detection logic 212 (or portions thereof) may be implemented in processor 202. These functional elements are shows as distinct blocks for clarity and ease of description.

Memory 204 may be configured to store at least one saved autobrake command 216 for the electric brake system. Autobrake commands control electric actuation of the brake mechanisms in the electric brake system. In this embodiment, saved autobrake commands 216 may be retrieved and processed following a power interrupt condition to provide seamless application of the aircraft brakes during autobraking. In this regard, the operation of brake mechanism control signal generator 206 may be influenced by saved autobrake commands 216.

Brake mechanism control signal generator 206, which may be realized in the processing logic of processor 202, is suitably configured to generate control signals for the aircraft brake mechanism(s). Referring to FIG. 1, brake mechanism control signal generator 206 may be implemented in BSCU 104 and therefore configured to generate or influence EBAC control signals, and/or implemented in EBAC 106 and therefore configured to generate or influence brake mechanism control signals.

Autobraking control logic 208, which may be realized in the processing logic of processor 202, represents the processing intelligence that enables the aircraft to operate the electric brake system in an autobrake mode. Aircraft autobraking can be utilized during a landing operation to enhance the efficiency and performance of the electric brake system. In connection with a typical autobraking operation, the pilot selects a level of autobraking corresponding to a desired deceleration of the aircraft. After the aircraft lands, the autobraking function monitors the actual deceleration and speed of the aircraft and adjusts the actuation of the brake mechanisms in an automated fashion to achieve the desired deceleration characteristic.

Pedal braking control logic 210, which may be realized in the processing logic of processor 202, represents the processing intelligence that enables the aircraft to operate the electric brake system in a pedal braking mode. Such pedal braking relies upon pilot input and deflection of the brake pedals (as described above in the context of FIG. 1).

Power interrupt detection logic 212, which may be realized in the processing logic of processor 202, represents the processing intelligence that enables the electric brake system to detect the onset (and termination) of a power interrupt condition. In typical aircraft applications, such power interrupts are very brief—they may last only 50-100 milliseconds. For this embodiment, power interrupt detection logic 212 analyzes a power status signal of the electric brake system to determine whether or not a power interrupt has occurred or is about to occur. The power status signal may represent an input power or voltage signal of a BSCU, an input power or voltage signal of an EBAC, and/or any voltage, current, or power level that is present in the electric brake system or the aircraft. Power interrupt detection logic 212 may be configured to compare the power status signal to a threshold level, potential, or voltage, and to indicate the onset of a power interrupt condition if the power status signal falls below the threshold level. For example, if the nominal operating voltage of the electric brake system is about 28 volts and the normal operating voltage range is 18 to 32 volts, power interrupt detection logic 212 can indicate a power interrupt condition if the voltage drops below 18 volts.

Figure 3:
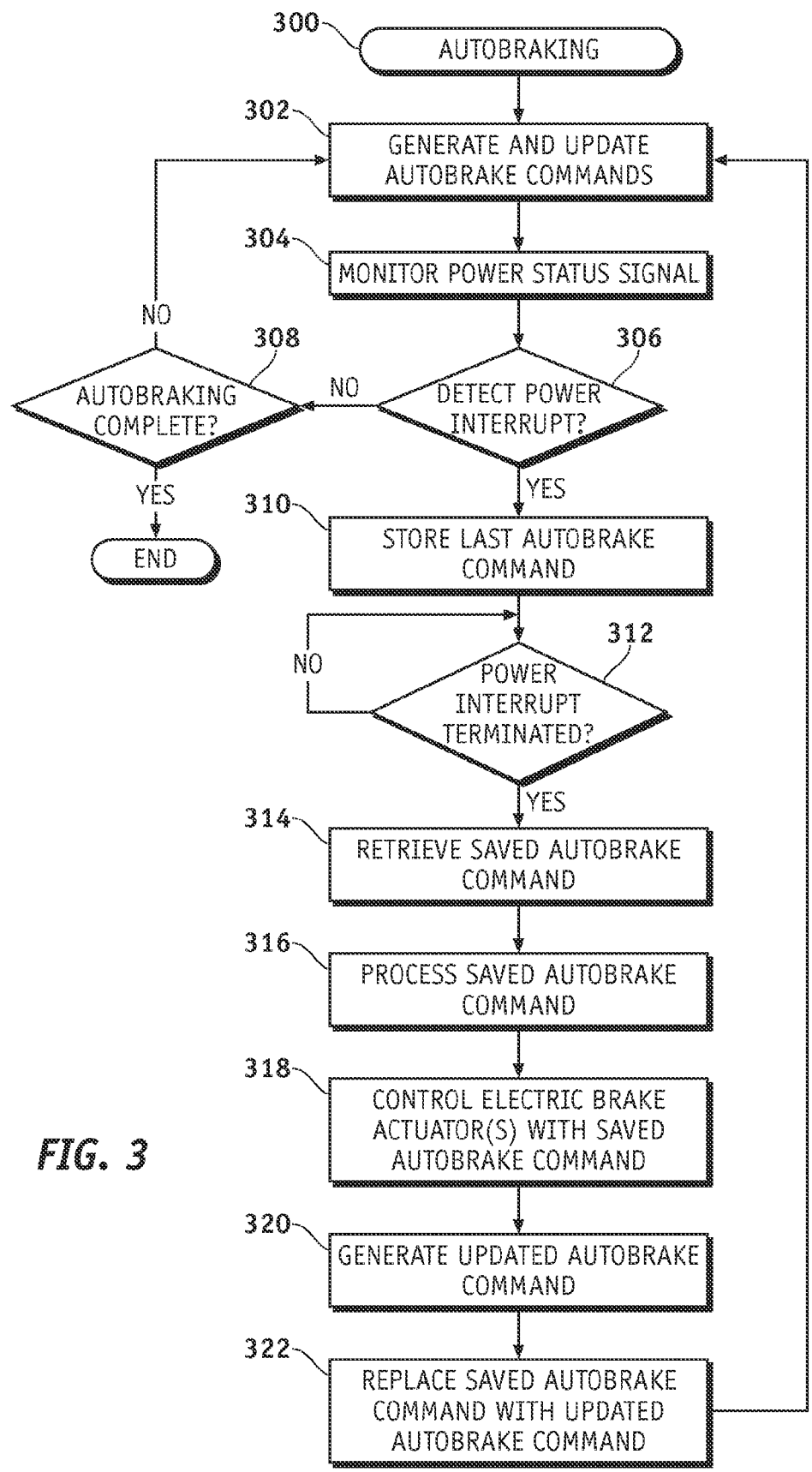
FIG. 3 is a flow chart that illustrates an autobraking process suitable for use in connection with an electric brake system for an aircraft.

FIG. 3 is a flow chart that illustrates an autobraking process 300 suitable for use in connection with an electric brake system for an aircraft. The various tasks performed in connection with process 300 may be performed by software, hardware, firmware, or any combination thereof. For illustrative purposes, the following description of process 300 may refer to elements mentioned above in connection with FIG. 1 and FIG. 2. In embodiments of the invention, portions of process 300 may be performed by different elements of the described system, e.g., a BSCU, an EBAC, a brake mechanism, or a processing element of the electric brake system. It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein.

A typical autobraking procedure was described above in the context of autobraking control logic 208. Autobraking process 300 preferably functions in this manner under normal conditions. In this regard, process 300 can generate, update, and process autobrake commands (task 302) in an ongoing manner while the aircraft operates the electric brake system in an autobraking mode. As mentioned above, autobrake commands control electric actuation of at least one brake mechanism in the electric brake system, and such autobrake commands need not be dependent upon any real-time pilot input. While operating in the autobrake mode, process 300 can monitor one or more power status signals of the electric brake system (task 304). During task 304, the power status signal may be continuously monitored or sampled at a suitable frequency. The monitored power status signal may be, without limitation: an input power/voltage of a BSCU; an input power/voltage of an EBAC; an input power/voltage of a brake mechanism; or the like. Process 300 analyzes the real-time value of this power status signal to detect the onset of a power interrupt condition (query task 306).

In connection with query task 306, autobraking process 300 may compare the current value of the power status signal to a threshold value, such as a threshold voltage. If the current value of the power status signal is less than the threshold value, then process 300 may indicate that a power interrupt condition has occurred or is about to occur. In practice, the indication of the onset of the power interrupt condition may simply be an internally generated flag or identifier that instructs process 300 to proceed as described below beginning with task 310. If, however, process 300 does not detect a power interrupt condition (query task 306), then process 300 may check whether autobraking is complete (query task 308). If autobraking is complete, then process 300 ends. If autobraking is not complete, then process 300 may be re-entered at task 302 to continue generating and updating the autobrake commands as needed.

In response to the detection of a power interrupt condition, autobraking process 300 stores the last autobrake command (task 310) as a saved autobrake command in a suitable memory location. The last autobrake command is the most recent autobrake command generated by the electric brake system before the power interrupt. Depending upon the specific implementation of the electric brake system and the timing involved, the last autobrake command may or may not have been executed by the brake mechanism(s). In addition, process 300 may pause autobrake command calculations during the power interrupt to prevent the autobrake algorithm from ramping up its brake application command when the brake mechanisms are incapable of being applied (which might occur during the power interrupt). The saved autobrake command is preserved until process 300 determines that the power interrupt condition has terminated (query task 312). In other words, process 300 idles until normal operating power has been reestablished in the electric brake system.

When normal operating power resumes, autobraking process 300 can retrieve the saved autobrake command (task 314) from memory and process the saved autobrake command (task 316) in an appropriate manner. For this embodiment, the electric brake system processes the saved autobrake command in a manner that provides seamless application of brakes upon termination of the power interrupt condition. In particular, the electric brake system controls the electric brake actuator(s) with the saved autobrake command (task 318). In practice, the use of the saved autobrake command ensures that the most recent brake actuation state is preserved. Otherwise, the electric brake system may inadvertently increase or decrease the amount of brake clamping force by an excessive amount that results in lurching or jerking of the aircraft when normal operating power resumes.

Once normal operating power has been reestablished, the electric brake system can generate an updated autobrake command (task 320) if needed. After processing the saved autobrake command, autobraking process 300 can replace the saved autobrake command with the updated autobrake command (task 322) and process the updated autobrake command in an appropriate manner. In other words, once the saved autobrake command has been retrieved and utilized by the electric brake system, the normal autobrake operating mode can be resumed, as indicated by the arrow from task 322 to task 302.

Figure 4:
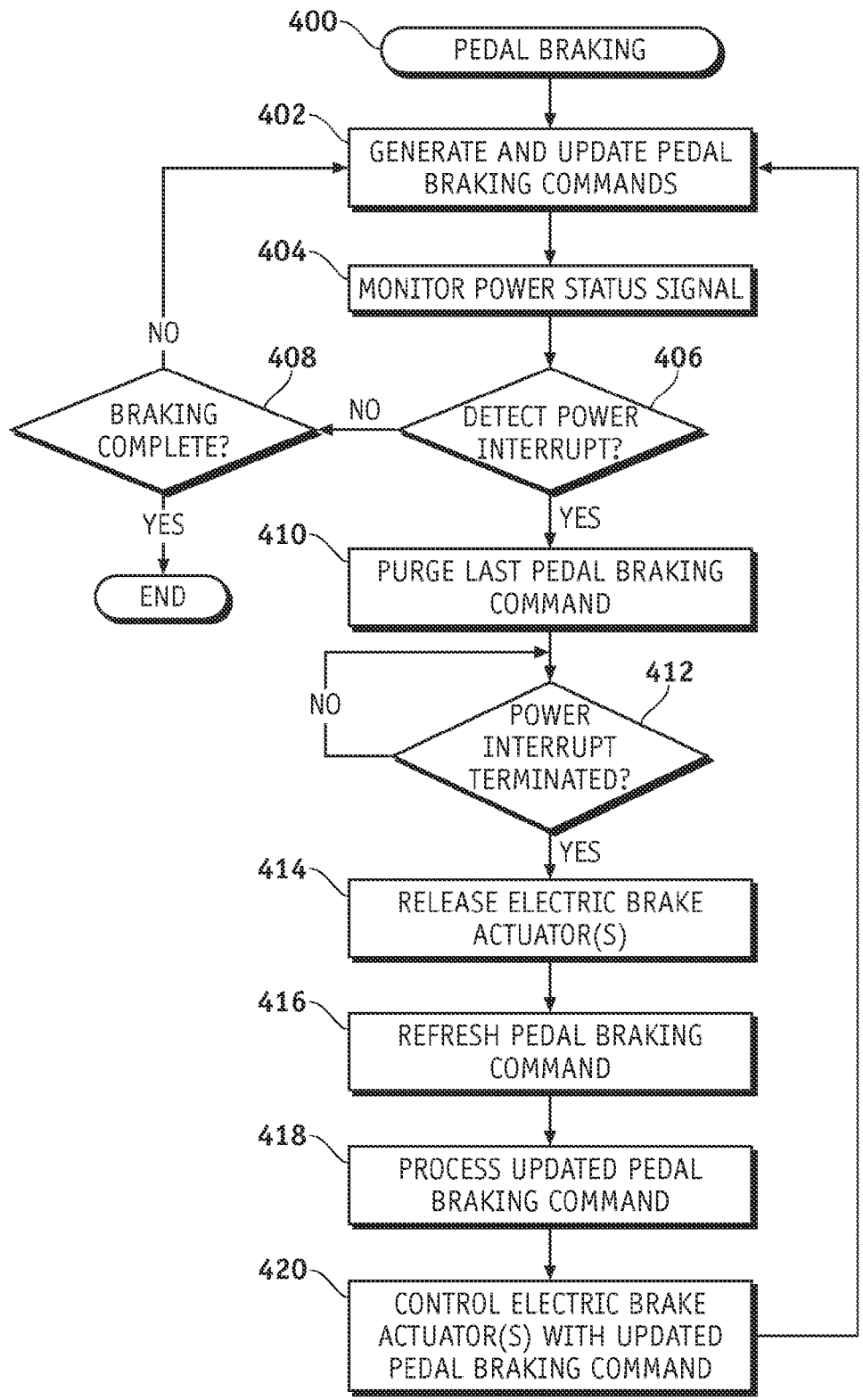
FIG. 4 is a flow chart that illustrates a pedal braking process suitable for use in connection with an electric brake system for an aircraft.

FIG. 4 is a flow chart that illustrates a pedal braking process 400 suitable for use in connection with an electric brake system for an aircraft. The various tasks performed in connection with process 400 may be performed by software, hardware, firmware, or any combination thereof. For illustrative purposes, the following description of process 400 may refer to elements mentioned above in connection with FIG. 1 and FIG. 2. In embodiments of the invention, portions of process 400 may be performed by different elements of the described system, e.g., a BSCU, an EBAC, a brake mechanism, or a processing element of the electric brake system. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein.

A typical pedal braking procedure was described above. Pedal braking process 400 preferably functions in this manner under normal conditions. In this regard, process 400 can generate, update, and process pedal braking commands (task 402) in an ongoing manner while the aircraft operates the electric brake system in a pedal braking mode. As mentioned above, pedal braking commands control electric actuation of at least one brake mechanism in the electric brake system, and such pedal braking commands are generated when the pilot depresses the aircraft brake pedal(s). While operating in the pedal braking mode, process 400 can monitor one or more power status signals of the electric brake system (task 404) and detect the onset of a power interrupt condition (query task 406) in the manner described above for autobraking process 300.

The onset of the power interrupt condition may cause pedal braking process 400 to proceed as described below beginning with task 410. If, however, process 400 does not detect a power interrupt condition (query task 406), then process 400 may check whether the braking operation is complete (query task 408). If braking is complete, then process 400 ends. If braking is not complete, then process 400 may be re-entered at task 402 to continue generating and updating the pedal braking commands as needed.

In response to the detection of a power interrupt condition, pedal braking process 400 purges or deletes the last (or current) pedal braking command (task 410). The last pedal braking command is the most recent command generated by the electric brake system before the power interrupt. Depending upon the specific implementation of the electric brake system and the timing involved, the last pedal braking command may or may not have been executed by the brake mechanism(s). The last pedal braking command is purged to ensure that the electric braking system does not inadvertently refresh itself with that command when it regains normal operating power. Process 400 may idle until it determines that the power interrupt condition has terminated (query task 412). In other words, process 400 idles until normal operating power has been reestablished in the electric brake system.

When normal operating power resumes, pedal braking process 400 may cause the electric brake system to release the electric brake actuator(s) in the brake mechanism(s) before the brakes are reapplied (task 414). This releasing of the actuators may be desirable to prepare them for subsequent activation and actuation. Moreover, this releasing of the actuators allows the electric brake system to wait until it receives the next pedal braking command (which is desirable to accommodate the situation where the pilot completely releases the brake pedals during the power interrupt). After releasing the actuators, process 400 refreshes the pedal braking command (task 416) by generating an updated pedal braking command that indicates the amount of brake pedal deflection that exists upon termination of the power interrupt condition. Process 400 can then process the updated pedal braking command (task 418) in an appropriate manner. For this embodiment, the electric brake system processes the updated pedal braking command in a manner that provides seamless application of brakes upon termination of the power interrupt condition. In particular, the electric brake system controls the electric brake actuator(s) with the updated pedal braking command (task 420). In practice, the use of the updated pedal braking command ensures that the electric brake system accounts for any pilot interaction with the brake pedal(s) that may have occurred during the power interrupt period. This results in the expected amount of braking force applied by the pilot. Once normal operating power has been reestablished, the electric brake system can resume the normal pedal braking mode, as indicated by the arrow from task 420 to task 402.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A method of operating an electric brake system for an aircraft, the method comprising:
   monitoring a power status signal of the electric brake system;
   detecting onset of a power interrupt condition based upon the power status signal; and
   controlling the electric brake system to provide seamless application of brakes upon termination of the power interrupt condition;
   wherein said controlling comprises operating the electric brake system in an autobrake mode; and
   storing a last autobrake command as a saved autobrake command in response to said detecting onset of the power interrupt condition.

2. A method according to claim 1, wherein:
   the electric brake system comprises a brake system control unit; and
   monitoring the power status signal comprises monitoring an input power signal of the brake system control unit.

3. A method according to claim 1, wherein:
   the electric brake system comprises an electric brake actuator control; and
   monitoring the power status signal comprises monitoring an input power signal of the electric brake actuator control.

4. A method according to claim 1, further comprising:
processing the saved autobrake command; and
controlling electric actuation of a brake mechanism in the electric brake system with said saved autobrake command.

5. A method according to claim 4, further comprising:
generating an updated autobrake command; and
replacing the saved autobrake command with the updated autobrake command after processing the saved autobrake command.

6. A method according to claim 1, wherein detecting onset of the power interrupt condition comprises:
comparing the power status signal to a threshold voltage; and
if the power status signal is less than the threshold voltage, indicating onset of the power interrupt condition.

7. A method of operating an electric brake system for an aircraft, the method comprising:
operating the electric brake system in an autobrake mode;
in response to onset of a power interrupt condition in the electric brake system, storing a last autobrake command as a saved autobrake command, wherein autobrake commands control electric actuation of a brake mechanism in the electric brake system; and
upon termination of the power interrupt condition, processing the saved autobrake command.

8. A method according to claim 7, further comprising:
monitoring a power status signal of the electric brake system; and
detecting onset of the power interrupt condition based upon the power status signal.

9. A method according to claim 8, wherein detecting onset of the power interrupt condition comprises:
comparing the power status signal to a threshold voltage; and
if the power status signal is less than the threshold voltage, indicating onset of the power interrupt condition.

10. A method according to claim 7, further comprising:
generating an updated autobrake command; and
replacing the saved autobrake command with the updated autobrake command after processing the saved autobrake command.

11. An electric brake system for an aircraft, the electric brake system comprising:
a brake mechanism;
an electric brake actuator coupled to the brake mechanism; and
a brake control architecture coupled to the electric brake actuator, the brake control architecture comprising processing logic configured to:
control actuation of the electric brake actuator;
monitor a power status signal of the electric brake system;
detect onset of a power interrupt condition based upon the power status signal;
control the electric brake actuator to provide seamless actuation of the brake mechanism upon termination of the power interrupt condition;
wherein the processing logic of the brake control architecture is configured to operate the electric brake system in an autobrake mode; and
the electric brake system further comprises a memory element configured to store a last autobrake command as a saved autobrake command in response to onset of the power interrupt condition.

12. An electric brake system according to claim 11, wherein:
the brake control architecture comprises a brake system control unit; and
the power status signal represents an input power signal of the brake system control unit.

13. An electric brake system according to claim 11, wherein:
the brake control architecture comprises an electric brake actuator control; and
the power status signal represents an input power signal of the electric brake actuator control.

14. An electric brake system according to claim 11, wherein:
the processing logic of the brake control architecture is configured to retrieve the saved autobrake command in response to termination of the power interrupt condition; and
said saved autobrake command controls operation of the electric brake actuator.

* * * * *